Patented June 11, 1940

2,203,919

UNITED STATES PATENT OFFICE 2,203,919

COMBINATION INSECTICIDE COMPOSITION

Donald F. Murphy, Bristol, Pa., assignor to Röhm & Haas Company, Philadelphia, Pa.

No Drawing. Application July 25, 1935,
Serial No. 33,061

9 Claims. (Cl. 167—22)

This invention relates to improvements in insecticides and more particularly to improvements in contact poisons.

It has been proposed to use several materials either as powders or in solutions of suitable concentration for such purposes among which may be mentioned pyrethrum, nicotine, either free base or sulfate, and rotenone or extracts from plants yielding compounds of the rotenone group, and other materials. All of these contact insecticides are useful and of value in combating insect pests. They have, however, certain disadvantages such as susceptibility to oxidation or hydrolysis, sensitivity to light or too ready volatility for sustained effect. Derris products and the like although fairly effective are rather slow in their action.

It is an object of this invention to provide a method for improving the killing power, rapidity of action and stability of these materials. This object is accomplished by adding to the natural insecticides of the types enumerated above certain thiocyano derivatives of organic compounds. These thiocyano compounds may be added to any of the above insecticides or to a mixture of any two or more of them.

Thiocyano compounds which are effective in improving the action of pyrethrum and other natural insect poisons fall into various classes.

These include the aliphatic, aromatic, aryl-aliphatic and hydro-aromatic esters of thiocyanic acid; dialkyl ethers containing one or more thiocyano groups; esters of mono- or polycarboxylic acids containing one or more thiocyano groups in the alcohol and/or the acid radicals; acetals, aromatic thiocyano compounds; polythiocyano compounds, etc.

These classes are exemplified by the following compounds:

Esters of thiocyanic acid include n-butyl, tertiary butyl, n-amyl, isoamyl, tertiary amyl, octyl, secondary octyl, lauryl, cetyl, cyclohexyl, $\alpha,\alpha,\gamma,\gamma$-tetramethylbutylcyclohexyl, phenyl, benzyl and esters of the monoalkylethers of ethylene glycol such as the methyl, ethyl, propyl, butyl, etc.

Esters of $\beta$-thiocyanoethyl alcohol and aliphatic carboxylic acids such as lauric, acetic, etc.

Esters of thiocyanocarboxylic acids such as methyl, ethyl, amyl, lauryl, $\beta$-ethoxyethyl, etc. esters of thiocyanoacetic acid, butyl, amyl, secondary octyl, cyclohexyl, $\beta$-ethoxyethyl, etc., esters of $\beta$-thiocyanopropionic acid; di-ethyl thiocyanomalonate.

Dithiocyano compounds such as dithiocyanoethylene, dithiocyano styrene, etc.

Acetals such as $\alpha(\beta$-thiocyanoethoxy$)\alpha(\beta'$-chlorethoxy$)\beta$ - methylpropane; $\alpha,\alpha$-bis$(\beta$-thiocyanoethoxy$)$heptane; bis$(\beta$-thiocyanoethoxy$)$ methane; $\alpha,\alpha$-bis$(\beta$-thiocyanoethoxy$)$ethane; $\alpha,\alpha$-bis$(\beta$-thiocyanoethoxy$)$propane; $\alpha,\alpha$-bis$(\beta$-thiocyanoethoxy$)$butane; $\alpha,\alpha$-bis$(\beta$-thiocyanoethoxy$)$butene-2; $\alpha,\alpha$-bis$(\beta$-thiocyanoethoxy$)\gamma$-thiocyanopropane; $\alpha,\alpha$-bis$(\beta$-thiocyanoethoxy$)\beta$-methylpropane; bis$(\gamma$ - thiocyanopropoxy$)$ methane; $\alpha,\alpha$-bis$(\gamma$-thiocyanopropoxy$)\beta$-methylpropane.

Bis$(\beta$-thiocyanoethoxyethyl$)$ esters of dibasic acids such as succinic, sebacic, etc.

Ethers containing thiocyano groups in various positions such as $\beta$-thiocyanoethyl-ethyl ether; $\beta$-thiocyanoethyl-butyl ether; $\beta$-thiocyano-$\beta'$-butoxydiethyl ether; $\beta$-thiocyano-$\beta'$-isobutoxydiethyl ether; $\beta$ - thiocyano-$\beta'$-ethoxydiethyl ether; $\beta$-thiocyano-$\beta'$-phenoxydiethyl ether; $\beta$-thiocyano-$\beta'$-(p-chlorophenoxy)diethyl ether; $\beta$-thiocyano-$\beta'$-(o-chlorophenoxy)diethyl ether; $\beta$-thiocyano-$\beta'$-(p-nitrophenoxy)diethyl ether; $\beta$-thiocyano-$\beta'(\alpha,\alpha,\gamma,\gamma$-tetramethylbutylphenoxy$)$ diethyl ether; $\beta$-thiocyano-$\beta'$-cresoxydiethyl ether and also ethers of the types $\beta$-thiocyano-$\beta'$-formoxydiethyl ether; $\beta$-thiocyano-$\beta'$-acetoxy-$\beta'$-formoxydiethyl ether; $\beta$-thiocyano-$\beta'$-acetoxydiethyl ether; $\beta$-thiocyano-$\beta'$-(ethoxyacetoxy) diethyl ether; $\beta$-thiocyano-$\beta'$-butyroxydiethyl ether; $\beta$-thiocyano-$\beta'$-isobutyroxydiethyl ether; $\beta$-thiocyano-$\beta'$-benzoxydiethyl ether; $\beta$-thiocyano-$\beta'$-naphthenoxydiethyl ether; $\beta$-thiocyano-$\beta'$-furoxydiethyl ether; bis$(\beta$-thiocyanoethyl$)$ ether, etc.

Aromatic thiocyano compounds such as p-thiocyano aniline, p-thiocyano toluidine, p-thiocyanodimethylaniline, p-thiocyanoanisidine, p-thiocyanobenzylaniline, thiocyano - 2,4 - dinitrobenzene, thiocyanoacetophenone, thiocyano-$\alpha$-naphthol, thiocyano-$\alpha$-naphthylamine, p-thiocyanophenylmorpholine, dithiocyanodiphenylamine, etc.

Various thiocyano compounds such as thiocyano acetone and other thiocyano ketones, 2,3-bis$(\beta$-thiocyanoethoxy$)$ dioxane; bis$(\beta$-thiocyanoethyl$)$sulfoxide; $\alpha,\beta$-bis$(\beta$-thiocyanoethoxymethoxy$)$ ethane; $\alpha,\gamma$-dithiocyanoacetone; $\alpha,\gamma$-dithiocyanopropanol-2; bis$(\beta$-thiocyanoethoxyphenyl$)$ methane; tris$(\beta$-thiocyanoethylamine$)$; bis$(\beta$-thiocyanoethyl$)$ sulfide.

The amount of the thiocyano derivative which may be added to the natural insecticide varies over a wide range depending on the effectiveness of both components and on the degree of improvement in effectiveness and rapidity of action desired. The amount added may vary from less than one per cent. to more than ten per cent. of the natural insecticide.

These thiocyano compounds will also increase the fungicidal properties of such materials as liquid lime-sulfur solutions, etc.

The following examples will illustrate the invention, which, however, is not limited to the exact details of concentration, specific thiocyano derivative, solvent, etc. shown as the invention may be otherwise practiced within the scope of the appended claims.

Example 1

Powdered pyrethrum flowers are allowed to soak up 1% of their weight of $\alpha(\beta$-thiocyanoethoxy$)$-$\alpha(\beta'$-chloroethoxy$)\beta$-methylpropane and the mixture is then thoroughly worked so as to insure uniform distribution. The resulting powder may be blown into a room by means of a current of air. Any flies, mosquitoes, roaches etc. in the room will all be killed within a few minutes. Parasitic insects like plant lice, red spiders etc. may be killed by dusting the plant with this powder. In the same manner fleas and similar insects on domestic pets may also be killed. This mixture is much more rapid in its action than the pyrethrum alone.

Example 2

Powdered derris is allowed to soak up 1% of its weight of $\alpha(\beta$-thiocyanoethoxy$)$-$\alpha(\beta'$-chloroethoxy$)$-$\beta$-methylpropane and the powder is thoroughly mixed to insure uniform distribution. This powder may be used as described in Example 1 and the increase in effectiveness is even greater than with pyrethrum.

Example 3

Powdered cubé is mixed with 3 to 5% of its weight of finely ground p-thiocyano-dimethylaniline. The resulting powder is very effective for the elimination of flies, mosquitoes, etc.

Example 4

One pound of pyrethrum flowers is extracted with one gallon of kerosene and to this solution is added 1¼ ounces of $\beta$-thiocyano-$\beta'$-butoxy-diethylether. If desired, a perfume may be added to improve the odor. The resulting solution may be used as a spray and its effectiveness is much greater than that of pyrethrum alone. The pyrethrum extract alone will knock down 98 to 99% of flies within ten minutes and kill a total of about 65% after twenty-four hours when tested according to the Peet-Grady method (J. Econ. Entomology, 21, 598 (1928)). The addition of the thiocyano compound increases these figures to 100% knockdown in two minutes and better than 80% kill in twenty-four hours.

Example 5

In place of the pyrethrum extract shown in Example 4 an extract of ground derris made in the same way may be substituted. Derris is a slow but effective poison and in this instance the improvement due to the addition of the $\beta$-thiocyano-$\beta'$-butoxydiethyl ether is in the increase in "knockdown" (Peet-Grady Test) from about 40% to approximately 100%.

The oil solutions shown in Examples 4 and 5 may be emulsified in water with the help of emulsifying agents such as sulfonated or sulfated oils or their salts, triethanol-amineoleate etc. In this form the improved insecticide is very effective against greenhouse pests when atomized into the air without directly hitting the plants.

Example 6

An aqueous emulsion containing 0.05% nicotine, 0.02% $\beta$-thiocyanoethyllaurate and 0.05% sodium lauryl sulfate, when sprayed on young nasturtium plants will kill more than 95% of aphis infestation without injuring the foliage.

Example 7

10 cc. of a solution containing 0.5 g. rotenone per liter of ethanol is poured into 100 cc. of water and stirred. To this mixture there is added 0.2 g. of lauryl thiocyanoacetate and 0.5 g. of a neutral soap. When sprayed on a coleus plant infested with mealy bug, the solution will kill all the young bugs and about one-half of the adult forms in a very short time, so that the plants may be syringed off within an hour. Commercial pyrethrum-soap preparations may be used to replace all or part of the rotenone and any other good spreading and wetting agent may be used to replace the soap.

Example 8

An aqueous mixture containing 0.05% of $\beta$-thiocyano-$\beta'$-ethoxy-diethylether, 0.05% sodium lauryl sulfate and 5% of commercial liquid lime-sulfur solution is a very effective combined insecticide and fungicide. This solution may be used effectively in orchards in order to destroy aphids, leaf-hoppers etc. and apple scab or other fungus infections. Other thiocyano compounds may be used in place of the $\beta$-thiocyano-$\beta'$-ethoxydiethylether.

Any of the thiocyano compounds mentioned above or similar ones may be used to replace the specific ones shown in the examples. The relative proportions of thiocyano compound and other poison may be varied as desired or according to the particular conditions encountered. The thiocyano compounds may be incorporated with the other poisons in any suitable manner depending on the physical state of both ingredients, viz: solids, solutions or liquids. Solid thiocyano derivatives may, for instance, be dissolved in a volatile solvent, mixed thoroughly with some other solid poison and the solvent evaporated.

Any suitable solvent may be used in place of the kerosene shown in the examples. In case the thiocyano compound is not soluble in the kerosene another solvent may be added, best by dissolving the thiocyano compound in a suitable solvent and adding this solution to the kerosene containing the plant extract. Commercial concentrates of pyrethrum may be used in place of the flowers provided the final solution is prepared so as to contain the desired relative amounts of pyrethrum extract and thiocyano compound.

Perfumes may be added if desired to mask the odor of the kerosene or other substance having a disagreeable odor. If desired, phenols, naphthalene, chlorinated compounds may also be added to the solution or emulsion of the thiocyano compound and other poison.

All of these mixed insecticides containing a thiocyano compound and naturally occurring insect poison may be used as contact poisons for all kinds of insects such, for example, as flies, mosquitoes, roaches, moths, ants, fleas, lice etc. as well as for their eggs, larvae or nymphs.

In place of the extract of derris shown in some of the examples finely ground derris root may be suspended in water and a solution of a thiocyano compound in an organic liquid may be emulsified therein in order to improve the action of the derris root.

In the following claims the term "organic thiocyano compound" is understood to mean all of those types of compound shown in the specification containing one or more thiocyano groups.

I claim:

1. An insecticidal composition comprising an organic thiocyano compound and derris root.

2. An insecticidal composition comprising an organic thiocyano compound and an extract of derris root.

3. An insecticidal composition comprising an aqueous emulsion in which the disperse phase is a solution of an insecticidal composition containing an organic thiocyano compound and an extract of derris root.

4. An insecticidal composition comprising derris root and an aliphatic thiocyano compound.

5. An insecticidal composition comprising derris root and a thiocyano derivative of a monoalkyl ether of diethylene glycol.

6. An insecticidal composition comprising an organic thiocyano compound and rotenone.

7. An insecticidal composition comprising an aqueous emulsion in which the disperse phase is a solution of an insecticidal composition containing an organic thiocyano compound and rotenone.

8. An insecticidal composition comprising rotenone and an aliphatic thiocyano compound.

9. An insecticidal composition comprising rotenone and a thiocyano derivative of a monoalkyl ether of diethylene glycol.

DONALD F. MURPHY.